United States Patent [19]

Teramoto

[11] Patent Number: 5,571,632
[45] Date of Patent: Nov. 5, 1996

[54] NONAQUEOUS ELECTROLYTE SOLUTION SECONDARY CELL AND METHOD FOR PRODUCING THE SAME

[75] Inventor: Kazunori Teramoto, Fukushima, Japan

[73] Assignee: Sony Corporation, Tokyo, Japan

[21] Appl. No.: 493,100

[22] Filed: Jun. 21, 1995

[30] Foreign Application Priority Data

Jun. 22, 1994 [JP] Japan .................................. 6-163248
Jan. 9, 1995 [JP] Japan .................................. 7-017468

[51] Int. Cl.$^6$ .................................................. H01M 4/00
[52] U.S. Cl. .................. 429/94; 429/133; 429/164; 429/165; 429/166; 429/170; 429/171; 429/185; 29/623.1; 29/623.2
[58] Field of Search .............................. 429/94, 133, 164, 429/165, 166, 170, 171, 172, 173, 185; 29/623.1, 623.2

[56] References Cited

U.S. PATENT DOCUMENTS

| | | | |
|---|---|---|---|
| 4,731,308 | 3/1988 | Goebel et al. ......................... | 429/94 |
| 4,767,683 | 8/1988 | Yamada et al. ......................... | 429/42 |
| 4,802,275 | 2/1989 | Freluche ................................ | 429/94 |
| 5,279,907 | 1/1994 | Paterek et al. ....................... | 29/623.2 |
| 5,288,564 | 2/1994 | Klein et al. ............................. | 429/94 |

*Primary Examiner*—Bruce F. Bell
*Attorney, Agent, or Firm*—Hill, Steadman & Simpson

[57] ABSTRACT

A cylindrical nonaqueous electrolyte solution secondary cell having a high productability and a high sealability is provided. The nonaqueous electrolyte solution secondary cell is a double tube type structure having a spiral electrode laminate structure obtained by spirally winding strip-shaped anode and cathode through a separator around an inner tube between the inner tube and an outer tube. The cell includes a ring-shaped electrically insulating gasket inserted into the inner circumferences of the outer tube at both ends of the inner tube and the outer tube, and first and second ring-shaped sealing plates provided between the inner circumferences of the ring-shaped electrically insulating gasket and the outer circumference of the inner tube. Both the ends are sealed by press-fitting the ring-shaped sealing plates and the inner tube by expanding the inner tube from inside.

9 Claims, 7 Drawing Sheets

NONAQUEOUS ELECTROLYTE SOLUTION SECONDARY CELL AND METHOD FOR PRODUCING THE SAME

BACKGROUND OF THE INVENTION

The present invention relates to a cylindrical nonaqueous secondary cell which may be used in an electric automotive vehicle or the like to obtain a high energy density and a large capacity.

Recently, electronic equipment has been provided with a high performance, miniaturized and made portable by the development of the electronic technology. Accordingly, there is a strong demand that a secondary cell used in the electronic equipment has a high energy density.

A nickel/cadmium battery, a lead storage battery and the like have been conventionally used as the secondary cells to be used in the electronic equipment. However, these batteries are inferior in discharge potential level and it is insufficient to obtain the cells having a high energy density.

Accordingly, a lithium ion secondary cell has been vigorously researched and developed which is of a nonaqueous solution secondary cell using, as a cathode, a lithium ion such as lithium, lithium alloy or carbon material which may be doped or dedoped and using, as an anode, a lithium complex oxide such as a lithium cobalt complex oxide.

The lithium ion secondary cell ha a high battery voltage and a high energy density and is superior in self-discharge property and recycle characteristics. In particular, there is a strong demand in developing a battery having a high voltage (several tens to several hundreds of volts), a high energy capacity and a high energy density for use in a power storage station or an electric vehicle for the purpose of saving energy and moderating the contamination of the environment.

A cylindrical, nonaqueous electrolytic solution secondary battery in which a spiral electrode laminate structure formed by winding strip-shaped cathodes and anodes through separators is received in a cylindrical metal case has been proposed as a structure of the lithium ion secondary cell. It is possible to increase an electrode area by forming the nonaqueous electrolytic solution secondary cell into the spiral electrode laminate structure and to obtain a cell which is superior in load characteristics.

On the other hand, such a nonaqueous electrolytic solution secondary cell having the spiral electrode laminate structure with a high voltage and a high capacity suffers from a problem that the heat is generated upon the discharge.

Also, in the cylindrical nonaqueous electrolytic solution secondary cell, it is necessary to seal both ends of the cylindrical metal case with sealing plates. In general, it is proposed to use an argon welding to attach the sealing plates to both ends of the metal case. However, there is a fear that the heat generated during the argon welding would damage the spiral electrode laminate structure.

In this case, if a laser welding is used instead of the argon welding, the heat problem would be moderated to some extent. However, when the laser welding is carried out, it is difficult to obtain a reliability of the sealing of the interior of the cell with the sealing plates. Also, in order to enhance the sealability, it takes a long period of time for welding operation, which leads to the degradation of the productability. Although it is possible to theoretically apply a microwave welding to this, it is actually impossible to use this technology because of the reliability of the sealing is low.

Also, the cell case of the conventional cylindrical nonaqueous electrolytic solution secondary cell has been made of steel or nickel-plated stainless steel in view of the durability and the mechanical strength. However, since these materials have a large specific weight and are heavy, these materials are disadvantageous in weight energy density. Accordingly, it has been proposed to use a case made of light metal such as aluminum or titanium (in this case, connected to the anode) to thereby reduce the weight.

However, titanium is expensive as a constituent material for the nonaqueous electrolytic solution secondary cell. Accordingly, it would be difficult to use a large amount of titanium in a general field. It is practically general to use aluminum for the cell case in view of the durability.

However, the aluminum is lower in mechanical strength than the steel or the like. In the case where the cell case is made of material has a thickness which may sufficiently attain the object, it is impossible to obtain a necessary compression of a plastic-made gasket due to the insufficient mechanical strength with a sealing portion structure obtained by press-fitting the gasket between the metal portions and sealing the opening portion of the cell case by the stress.

Also, inversely, in the case where the cell case is made of a material having a thickness that may ensure the sufficient compression of the gasket with such a sealing portion, the purpose of sufficiently reducing the weight could not be attained.

SUMMARY OF THE INVENTION

An object of the present invention is to provide a cylindrical nonaqueous electrolytic solution secondary cell having a high productability as well as a high sealability.

Another object of the present invention is to provide a nonaqueous electrolytic solution secondary cell which is light in weight and in which a sealing is insured with a high storage property and a durability.

A nonaqueous electrolyte solution secondary cell according to the present invention is a double t be type structure having a spiral electrode laminate structure obtained by a spirally winding strip-shaped anode and cathode through a separator around an inner tube between the inner tube and an outer tube. The cell includes a ring-shaped electrically insulating gasket inserted into the inner circumferences of the outer tube at both ends of the inner tube and the outer tube, and first and second ring-shaped sealing plates provided between the inner circumferences of the ring-shaped electrically insulating gasket and the outer circumference of the inner tube. Both the ends are sealed by press-fitting the ring-shaped sealing plates and the inner tube by expanding the inner tube from inside.

According to the present invention, since, the ring-shaped electrically insulating gaskets are inserted into the inner circumferences of the outer tube at both ends of the respective inner and outer tubes, and the ring-shaped sealing plates are press-fitted and sealed between the inner circumferences of the ring-shaped electrically insulating gasket and the outer circumference of the inner tube, it is possible to readily perform the sealing by, for example, the pipe expander. There is no fear that the spiral electrode laminate structure or the like would be damaged due to the elevation of the temperature. Thus, the productability is improved. In addition, it is possible to provide a high sealability.

Also, according to the invention, the inner holes of the inner tube serves as a vent hole. Thus, the heat radiation performance is improved.

DESCRIPTION OF THE PREFERRED EMBODIMENTS

A nonaqueous electrolytic solution secondary cell according to one embodiment of the invention will now be described with reference to the accompanying drawings.

Figure 1:
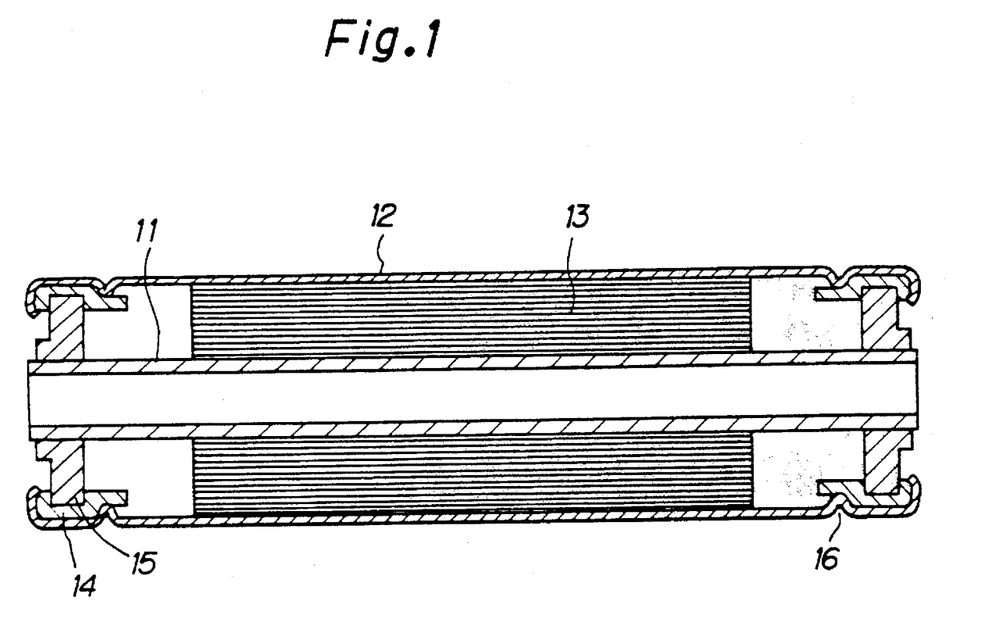
FIG. 1 is a cross-sectional view showing a nonaqueous electrolyte solution secondary cell according to an embodiment of the invention.

In FIG. 1, reference numeral 13 denotes a spiral electrode laminate structure in which a strip-shaped cathode 3 and a strip-shaped anode 2 are spirally wound through a separator 8 around an inner tube 11 so that the cathode and anode face each other.

The inner tube 11 is composed of a sleeve made of aluminum with a diameter of 20 mm, a length of 300 mm and a thickness of 2 mm, for example.

Figure 3:
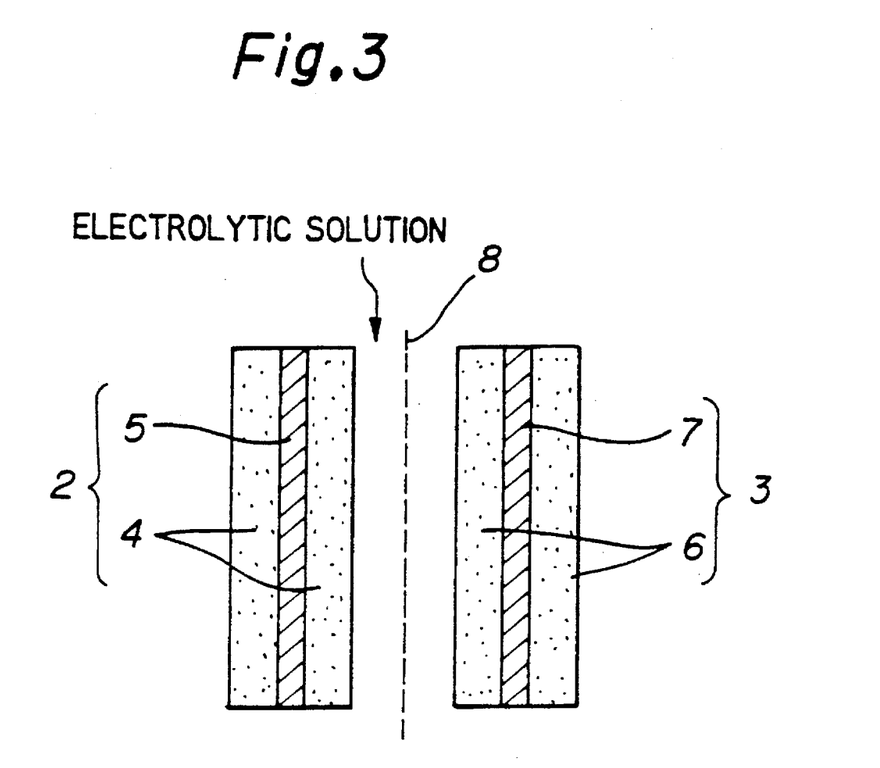
FIG. 3 is a schematic view illustrating an example of a lithium ion secondary cell.

The anode 2 is made as follows. A diffused slurry is made by mixing $LiCoO_2$ powder having an average size of 0.015 mm by 91 wt. parts, graphite as a conductive agent by 6 wt. parts, a vinylidene resin fluoride as a binder by 3 wt. part and by adding N-methyl pyrrolidone thereto. This mixture is applied to both side surfaces of an anode charge collector 5 made of a strip-shaped aluminum foil having a thickness of 0.03 mm, except for a lead portion, as an anode active material 4 as shown in FIG. 3. Thus, after drying, the mixture is compressed and molded to form the strip-shaped anode 2.

In the strip-shaped anode 2 after the molding, the coating thickness of the anode active material 4 is 0.08 mm on both sides, a width of the coating portion of the anode active material 4 is 190 mm and a length thereof is 3,150 mm.

For the cathode 3, a petroleum pitch is used as a starting material. After a function base including an oxygen is introduced by 10 to 20 wt. %, the material is baked at 1,000° C. in an inert gas ($N_2$ or the like) flow to obtain a carbon material which is pulverized to have a carbon material powder having an average size of 0.02 mm. The carbon material powder by 90 wt. parts and vinylidene resin fluoride by 10 wt. parts as a binder are mixed together. A slurry in which the mixture is dispersed into N-methyl pyrrolidone is applied to both side surfaces of a cathode charge collector 7 made of a strip shaped copper foil having a thickness of 0.02 mm, except for a lead portion, as a cathode active material 6 as shown in FIG. 3. After drying, it is compressed and molded to form the strip-shaped cathode 3.

In the strip-shaped cathode 3 after the molding, the coating thickness of the cathode active material 6 is 0.08 mm on both sides, a width of the coating portion of the cathode active material 6 is 200 mm and a length thereof is 3,200 mm.

After the lead portion which is a non-coated portion of the anode active material 4 on the anode charge collector 5 at a tip end portion of the thus obtained strip-shaped anode 2 is melt-fit by microwave welding or the like to the inner tube 11 made of aluminum, the anode 2 is sandwiched by two separators 8 each of which is 0.038 mm thick, 210 mm wide and 3,300 mm long and made of fine porous polypropylene film. Furthermore, the cathode 3 is overlapped on the anode 2, and the overlap is spirally wound around the inner tub 11 made of aluminum to thereby obtain the spiral electrode laminate member 13.

In this case, the outermost circumferential portion of the spiral electrode laminate structure 13 is occupied by the cathode 3 due to a relationship of lengths. The lead portion which is the non-coated portion of the cathode active material 6 in the cathode charge collector 7 is located at the outermost circumferential portion. A nickel foil which is 0.05 mm thickness, 200 mm wide and 160 mm long is resistance-welded to the lead portion to obtain an elongated cathode charge collector 7. The outermost circumference of the spirally electrode laminate structure 13 is wrapped by the nickel foil.

Figure 2A:
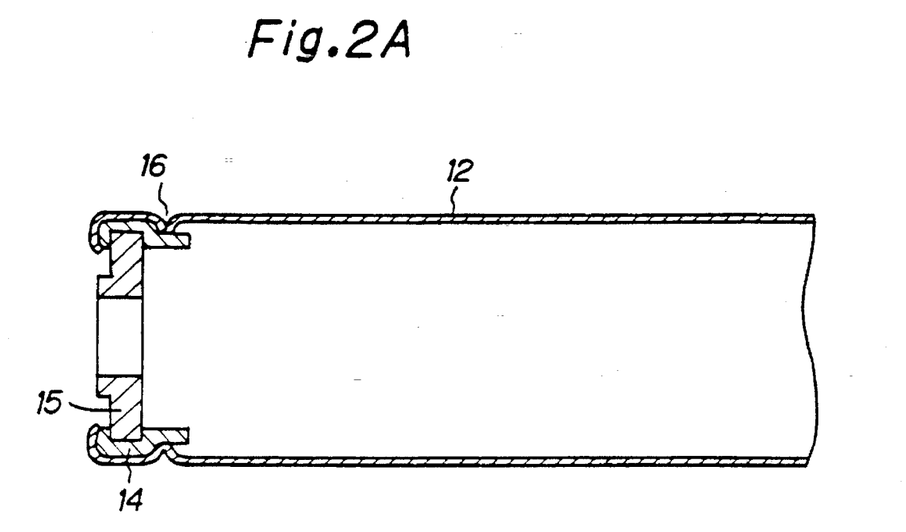
FIGS. 2A, 2B and 2C are schematic views showing a primary part of a method for producing a nonaqueous electrolyte solution secondary cell according to the present invention.

Also, in FIG. 1, reference numeral 12 denotes an outer tube which is made of a steel tube which is 50 mm in diameter, 310 mm long and 0.5 mm thick and which is subjected to a nickel-plating treatment. A bead machining is applied to a position of the outer tube 12 by 15 mm from one end thereof with a depth of 5 mm to form a bead machined portion 16 as shown in FIG. 2A. An electrically insulating annular gasket 14 made of polypropylene and a ring-shaped sealing plate 15 made of aluminum are mounted at the end of the outer tube 12 as shown in FIG. 2A. Thereafter, as shown in FIGS. 1 and 2A, one end edge of the outer tube 12 is press-fitted so that the electrically insulating annular gasket 14 and the ring-shaped sealing plate 15 are fastened thereto.

Figure 2B:
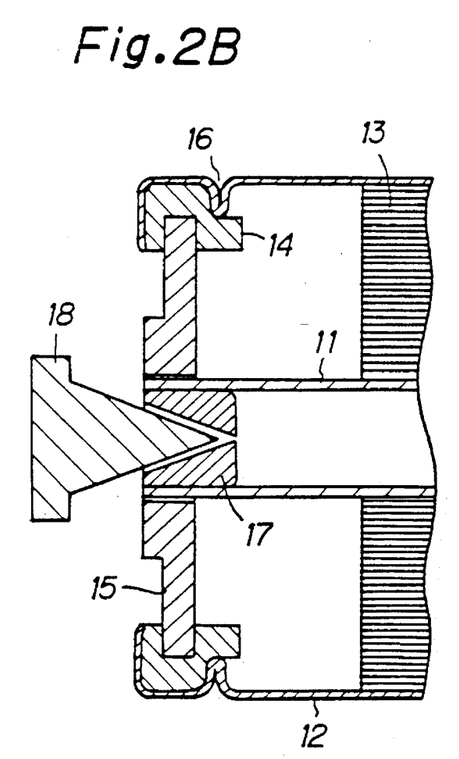

The spirally electrode laminate structure 13 obtained by winding the anode 2 and the cathode 3 spirally through the separators 8 around the inner tube 11 as a core is inserted into the outer tube 12 as shown in FIGS. 1 and 2B. The one end portion of the inner tube 11 is inserted into a center hole of the ring-shaped sealing plate 15 so that its edge is aligned exactly with the outer surface of the ring-shaped sealing plate 15. In this case, the nickel foil of the outer circumferential portion of the spiral electrode laminate structure 13 is brought into contact with the outer tube 12 for the electric connection, and the lead portion of the anode 3 of the spiral electrode laminate structure 13 is connected to the outer tube 12. Accordingly, in this case, the inner tube 11 and the outer tube 12 serve as the anode and the cathode, respectively.

Figure 2C:
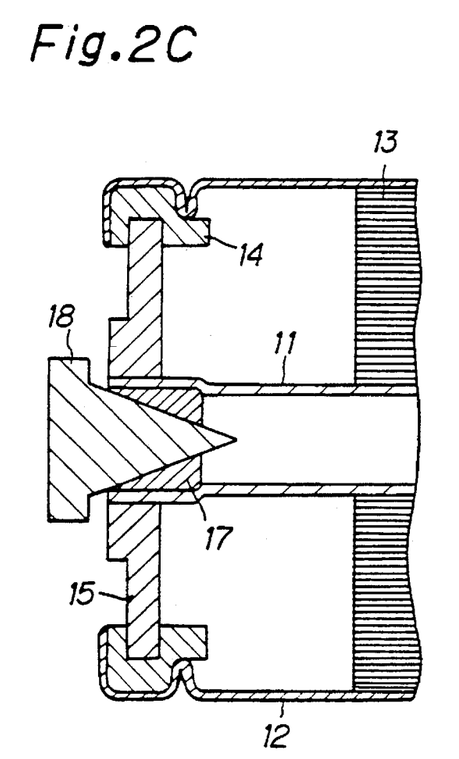

Subsequently, the one end portion of the inner tube 11 and the ring-shaped sealing plate 15 are press-bonded to each other by using a pipe expander (not shown) so that the one end portion of the outer tube 12 and the one end portion of the inner tube 11 are sealed by the ring-shaped sealing plate 15. Namely, as shown in FIGS. 2B and 2C, divided molds 17 are inserted into one end portion of the inner tube and are expanded by a pin 18 so that an outer diameter of the one end portion of the inner tube 11 is expanded to come into pressing contact with the inner circumference of the ring-shaped sealing plate 15. As a result, the one end portions of the outer tube 12 and the inner tube 11 are sealed by the ring-shaped sealing plate 15.

In this case, an enlargement amount of the outer circumference of the inner tube 11 to the inner circumference of the ring-shaped plate 15 is, for example, 0.05 mm, and a time needed for one sealing operation by the pipe expander is about 5 seconds.

Thereafter, as shown in FIG. 2A, a bead machining is applied to a position of the outer tube 12 by 15 mm from the other end thereof with a depth of 5 mm to form a bead machined portion 16. Subsequently, the one end portions of the outer tube 12 and the inner tube 11 are directed downwardly. An electrolytic solution obtained by dissolving $LiPF_6$ by 1 mol/l in a mixture solution of propylene carbonate and diethyl carbonate by one-to-one in volume is injected in between the other end portions of the outer tube 12 and the inner tube 11 which are kept upwardly.

Thereafter, as shown in FIG. 2A, the ring-shaped electric insulating gasket 14 made of polypropylene and the ring-shaped sealing plate 15 made of aluminum are mounted on the other end portion of the outer tube 12. Thereafter, as shown in FIGS. 1 and 2A, the other end edge of the outer tube 12 is press-fitted so that the ring-shaped electric insulating gasket 14 and the ring-shaped sealing plate 15 are fixed to each other. In this case, the other end of the inner tube 11 is inserted into the center hole of the ring-shaped sealing plate 15 so that its edge is aligned exactly with the outer surface of the ring-shaped sealing plate 15. Subsequently, the other end portion of the inner tube 11 and the ring-shaped sealing plate 15 are press-bonded to each other by using the pipe expander so that the other end portion of the outer tube 12 and the other end portion of the inner tube 11 are sealed by the ring-shaped sealing plate 15. Namely, as shown in FIGS. 2B and 2C, the divided molds 17 are inserted into the other end portion of the inner tube and are expanded by the pin 18 so that the outer diameter of the other end portion of the inner tube 11 is expanded to come into pressing contact with the inner circumference of the ring-shaped sealing plate 15. As a result, the other end portions of the outer tube 12 and the inner tube 11 are sealed by the ring-shaped sealing plate 15.

Through the above-described steps, a large capacity double tube type cylindrical lithium ion secondary battery which is 50 mm in diameter, 300 mm long and 25 Ah in electric capacity may be obtained.

According to this embodiment, since the ring-shaped electrically insulating gaskets 14 is pressingly inserted into the inner circumference of the outer tube 12 and the ring-shaped sealing plate 15 is press-fitted and sealed between the inner circumference of the ring-shaped electrically insulating gaskets 14 and the outer circumference of the inner tube 11 at both end portions of the inner tube 11 and the outer tube 12, it is possible to easily effect the sealing by, for example, the pipe expander. Also, since there is no temperature elevation, any damage is not applied to the spirally electrode laminate structure 13 or the like. This process is superior in productability. In addition, it is possible to obtain a high sealability or hermetic property.

Incidentally, as a comparison example, a spiral electrode laminate structure 13 was produced by spirally winding the strip-shaped anode 2, cathode 3, fine porous polypropylene film 8 and nickel foil, produced in the foregoing embodiment, around the inner tube 11 made of aluminum. This was inserted to the outer tube 12 made of steel and subjected to the bead machining in the same manner as in the foregoing embodiment.

Then, the inner tube 11 was inserted into the center hole of the ring-shaped sealing plate 15, made of aluminum, fixed to the bead machined portion 16 of one end portion of the outer tube 12 through the gasket 14 made of polypropylene. The portion between the inner tube 11 and the sealing plate 15 was seam-welded by using a YAG laser of 400 W. In this case, an interval between the inner tube 11 and the center hole of the sealing plate 15 was 0.01 mm. The time needed to seal this was about one minute.

Subsequently, after the bead machining had been carried out to the other end portion of the outer tube 12 in the same manner as in the foregoing embodiment, the same electrolyte as that of the above-described embodiment was injected from the other end portion. The other end portion of the inner tube 11 was inserted into the center hole of the ring-shaped sealing plate 15 made of aluminum. At the same time, the gasket 14 was pressed to the outer circumference of the sealing plate 15. Thereafter, the other end edge of the outer tube 12 was press-fitted. Then, a portion between the other end portion of the inner tube 11 and the inner circumference of the sealing plate 15 was seam welded by using the YAG laser of 400 W in the same manner as described above. A double tube type cylindrical lithium ion secondary battery which was 50 mm in diameter, 300 mm long and 25 Ah in electric capacity was obtained.

Figure 4A:
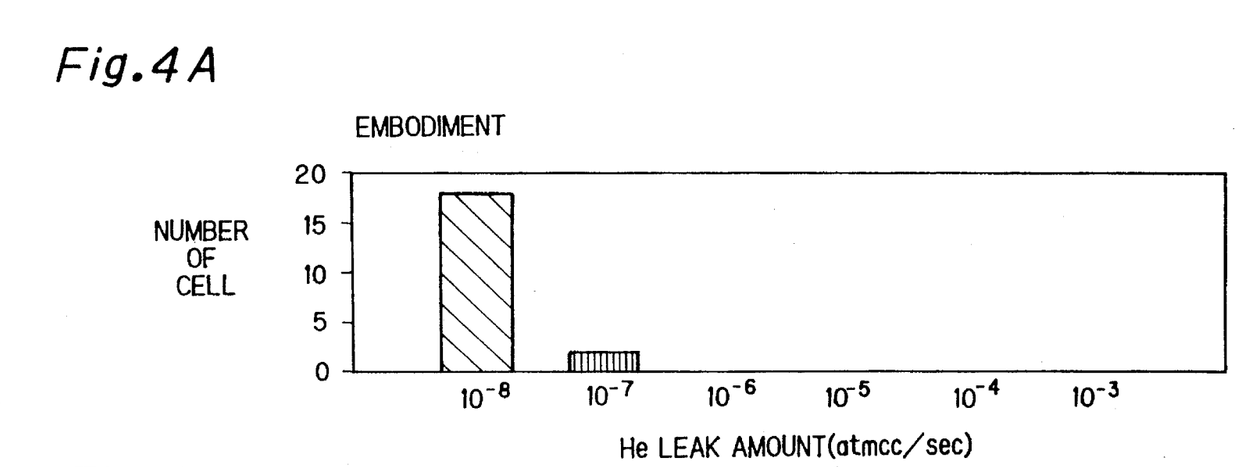
FIGS. 4A and 4B are diagrams showing the present invention.
Figure 4B:
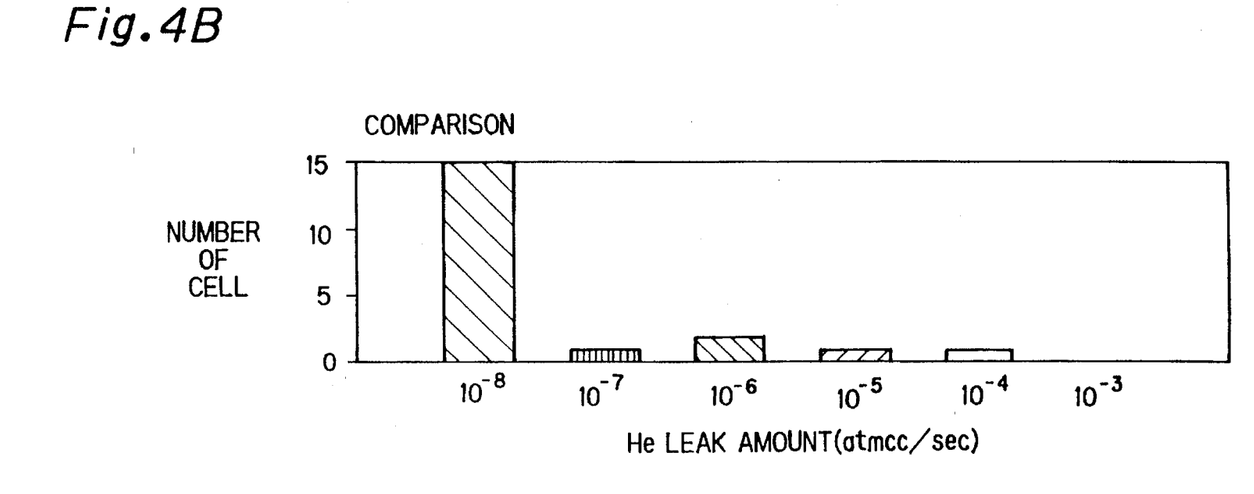

The results of the helium leak tests of twenty lithium ion secondary cells each between the foregoing embodiment and the comparison example are shown in FIGS. 4A and 4B. As is apparent from FIGS. 4A and 4B, the leak abnormality did not occur at all in the embodiment where the pipe expander was used to obtain the seal and compression but there were the leak faults of about 20% in the seam welding by the YAG laser in the comparison example.

Figure 5:
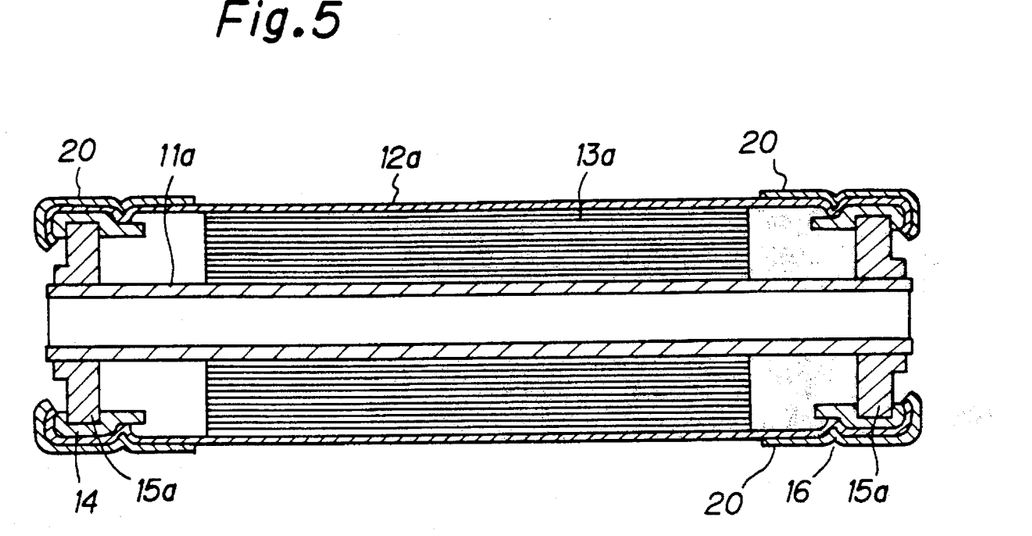
FIG. 5 is a cross-sectional view showing a nonaqueous electrolyte solution secondary cell according to another embodiment of the invention.

FIG. 5 shows another embodiment of the invention. In the embodiment shown in FIG. 5, the weight reduction of the double tube type cylindrical lithium ion secondary battery shown in FIG. 1 was intended. In the embodiment shown in FIG. 5, the same reference numerals are used to indicate the like members and components and their detailed explanation will be omitted.

In the embodiment shown in FIG. 5, the battery was formed in the same way as shown in FIG. 1. The lead portion which was the non-coated portion of the cathode active material 6 in the cathode charge collector in the end portion of the strip-shaped cathode 3 where a width of the coated portion of the cathode active material 6 was 200 mm and a length thereof was 3,200 mm was melt-bonded by the resistance welding or the like and wound around the inner tube 11a which was made of stainless steel and which was 20 mm in diameter, 300 mm long and 0.7 mm thick. Thereafter, the two separators 8 each of which was 0.038 thick, 210 mm wide and 3,300 mm long and made of fine porous polypropylene film sandwiched the cathode 3. Further, the anode 2 was overlapped therewith. The laminate was spirally wound around the inner tube 11a made of stainless steel by a number of turns to form a spirally electrode laminate structure 13a.

In this case, the length of the non-coated portion of the anode active material 4, i.e., the length of the lead portion was adjusted so that the outermost circumferential portion of the spiral electrode laminate structure 13a might be the anode charge collector 5. An aluminum foil which was 0.05 mm thick, 190 mm wide and 160 mm long was welded through microwaves to the anode charge collector 5 of the outermost circumferential portion to form an elongated anode charge collector 5. The outer circumference of the spiral electrode laminate structure 13a was wrapped by the aluminum foil.

An outer tube 12a which was relatively light in weight and made of aluminum and which was 50 mm in diameter, 310 mm long and 0.3 mm thick was prepared.

By the way, considering a mechanical strength and a thickness of aluminum and steel which may be used as a case material of the nonaqueous electrolytic solution, an elastic modulus of the steel is about three times larger than that of the aluminum. Then, an amount of warpage of the bending deformation is generally given by the following equation (1):

$$\delta = PL^3/4bh_3E \tag{1}$$

where $\delta$ is the amount of warpage, b is the width of the plate, P is the external bend, h is the thickness of the plate, L is the distance between support points, and E is the modulus of elasticity.

When the aluminum member having a thickness of $h_1$ and the steel member having a thickness of $h_2$ are subjected to the same external force, the condition where the warpages are equal to each other is given by the following equation (2) when L and b are kept constant.

$$h_1{}^3E_1 = h2_1{}^3E_2 \tag{2}$$

where $E_1$ is the modulus of elasticity of the aluminum member and $E_2$ is the modulus of elasticity of the steel member.

Thus, it is said that, in the case where the steel member is replaced by the aluminum member having the same mechanical strength, it is necessary to use the aluminum member having a thickness which is about four times larger than that of the steel member.

Accordingly, in the present embodiment, the relatively thin aluminum member was used to form the outer tube 12a and at the same time, a steel made reinforcement ring was engaged in the sealing portion.

Figure 6:
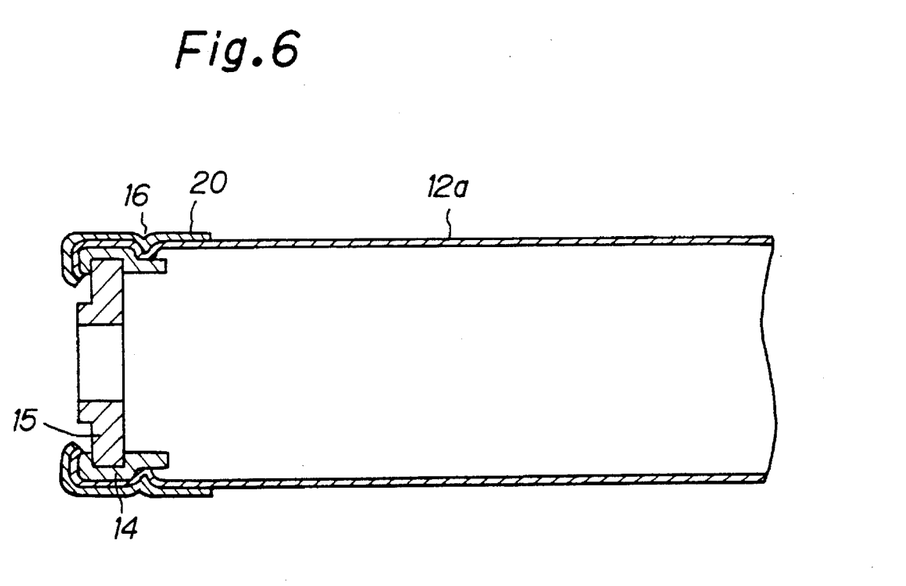
FIG. 6 is a cross-sectional view showing a primary part of the embodiment shown in FIG. 5.

Namely, in the embodiment, as shown in FIGS. 5 and 6, after the outer tube 12a made of aluminum was cooled down to 30° C., the nickel plated reinforcement ring 20 which was made of steel and which was 49.97 in inner diameter, 0.3 mm thick and 30 mm long was engaged with each of the sealing portions at both ends and disposed at room temperature to carry out a cold press-fit.

A bead machined portion 16 which was subjected to a bead machining at 15 mm from one end edge of the outer tube 12a around with the reinforcement ring 20 was press-fitted was provided. As shown in FIGS. 5 and 6, the ring-shaped gasket 14 made of polypropylene and the ring-shaped sealing plate 15a made of stainless steel were mounted thereon. After that, an outer tube part as shown in FIG. 6 was produced by press-fitting one end edge of the outer tube 12a.

The spiral electrode laminate member 13a wound around the above-described inner tube 11a as a core was inserted into the outer tube 12a of the outer tube part so that one end edge of the inner tube 11a was aligned exactly with the outer flat surface of the sealing plate 15a. In this case, the outermost circumferential aluminum foil of the spiral electrode laminate structure 13a was brought into contact with the inner surface of the outer tube 12a for the electric connection. Accordingly, in this case, the outer tube served as an anode and the inner tube 11a served as a cathode.

Subsequently, the one end portion of the inner tube 11a and the ring-shaped sealing plate 15a were press-bonded to each other by using a pipe expander (not shown) so that the one end portion of the outer tube 12a and the one end portion of the inner tube 11a were sealed by the ring-shaped sealing plate 15a.

Thereafter, a bead machining was applied to a position of the outer tube 12a by 15 mm from the other end thereof with a depth of 5 mm to form a bead machined portion 16. Subsequently, the one end portions of the outer tube 12a and the inner tube 11a were directed downwardly. An electrolytic solution obtained by dissolving $LiPF_6$ by 1 mol/l in a mixture solution of propylene carbonate and diethyl carbonate by one-to-one in volume was injected thereinto.

Thereafter, as shown in FIGS. 5 and 6, the ring-shaped electric insulating gasket 14 made of polypropylene and the ring-shaped sealing plate 15a made of stainless steel were mounted on the other end portion of the inner tube 11a. The other end edge of the outer tube 12a was press-fitted and finally by using the pipe expander as mentioned before, the inner tube 11a was expanded to be press-fitted to the inner circumference of the ring-shaped sealing plate 15a so that, as shown in FIG. 5, a double tube type cylindrical lithium ion secondary battery which was 50 mm in diameter, 300 mm long, and 25 Ah in electric capacity with a weight of 812 g and a weight energy density of 111 Wh/kg might be obtained.

According to the present embodiment, it is possible to obtain a lithium ion secondary cell which is superior in weight reduction, i.e., weight energy density with a high sealability. Also, it is easily understood that the same effect as that of FIG. 1 may be obtained in the embodiment shown in FIG. 5.

The example shown in FIG. 5 is regarded as example 1 and will be explained in comparison with comparison (control) examples 1, 2 and 3. As comparative example 1, a spiral electrode laminate structure 13 was produced by spirally winding the strip-shaped anode 2, cathode 3, fine porous polypropylene film 8 and nickel foil, produced in the same way as in the foregoing example 1 and the example shown in FIG. 1, around an inner tube 11 which was made of aluminum and which was 20 mm in diameter, 1 mm thick and 300 mm long in the same way as in the example shown in FIG. 1.

The length of the non-coated portion of the cathode active material 6 of the spiral electrode laminate structure 13 was adjusted so that the outermost circumferential portion of the spiral electrode laminate structure 13 could be the cathode charge collector 7. A nickel foil which was 0.05 mm thick, 200 mm wide and 160 mm long was resistance-welded to the cathode charge collector 7 of the outermost circumferential portion to form an elongated cathode charge collector 7. The outer circumference of the spiral electrode laminate structure 13 was wrapped by the nickel foil.

Subsequently, in the same way as shown in FIG. 1, a bead machining was effected to one end portion of the outer tube 12 which was made of steel and which was 50 mm in diameter, 0.5 mm thick and 310 mm long to form a bead machined portion 16. The ring-shaped electric insulating gasket 14 made of polypropylene and the ring-shaped sealing plate 15 made of aluminum were mounted on the end portion of the outer tube 12. Thereafter, the end edge of the outer tube 12 was press-fitted. The spiral electrode laminate structure 13 which was wound around the above-described inner tube 11 was inserted into the outer tube 12 so that the end face of the inner tube and the outer surface of the sealing plate 15 were aligned exactly with each other.

In this case, the nickel foil on the outermost circumference of the spiral electrode laminate structure 13 was brought into electric contact with the inner circumferential surface of the outer tube 12. Subsequently, a pipe expander (not shown) was used to expand the inner tube 11 to cause the latter to come into intimate contact with the inner circumferential surface of the sealing plate 15, so that the respective one end portions of the outer tube 12 and the inner tube 11 were sealed by the sealing plate 15.

Thereafter, the similar bead machined portion 16 was provided on the other end portion of the outer tube 12. An electrolytic solution obtained by dissolving LiPF$_6$ by 1 mol/l was added to a mixture solution of propylene carbonate and diethyl carbonate by one-to-one in volume.

Subsequently, after the ring-shaped sealing plate 15 made of aluminum and the ring-shaped gasket 14 made of polypropylene had been engaged with the other end portion of the inner tube 11, the other end edge of the outer tube 12 was press-fitted. Thereafter, the other end portion of the inner tube 11 was expanded by using the similar pipe expander as mentioned above, so that the other end portion was brought into pressing contact with the inner circumferential surface of the ring-shaped plate 15. The respective other end portions of the outer tube 12 and the inner tube 11 were sealed by the sealing plate 15.

Thus, a double tube type cylindrical lithium ion secondary battery which was 50 mm in diameter, 300 mm long, and 25 Ah in electric capacity with a weight of 890 g and a weight energy density of 101 Wh/kg was obtained.

As comparative example 2, a spiral electrode laminate structure 13a was produced by spirally winding the strip-shaped anode 2, cathode 3, fine porous polypropylene film and aluminum foil, produced in the same way as in the foregoing example 1 and the example shown in FIG. 1, around an inner tube 11a which was made of aluminum and which was 20 mm in diameter, 0.7 mm thick and 300 mm long.

The length of the non-coated portion of the anode active material 4 of the spiral electrode laminate structure 13a was adjusted so that the outermost circumferential portion of the spiral electrode laminate structure 13a could be the anode charge collector 5. An aluminum foil which was 0.05 mm thick, 190 mm wide and 160 mm long was welded through a microwave to the anode charge collector 5 of the outermost circumferential portion to form an elongated anode charge collector 5. The outer circumference of the spiral electrode laminate structure 13a was wrapped by the aluminum foil.

Subsequently, in the same way as the example 1 shown in FIG. 5, a bead machining was effected to one end portion of the outer tube 12a which was made of aluminum and which was 50 mm in diameter, 0.75 mm thick and 310 mm long to form a bead machined portion 16. The ring-shaped electric insulating gasket 14 made of polypropylene and the ring-shaped sealing plate 15 made of stainless steel were mounted on the end portion of the outer tube 12a. Thereafter, the end edge of the outer tube 12a was press-fitted. The spiral electrode laminate structure 13a which was wound around the above-described inner tube 11a was inserted into the outer tube 12a so that the end face of the inner tube and the outer surface of the sealing plate 15a were aligned exactly with each other.

In this case, the aluminum foil on the outermost circumference of the spiral electrode laminate structure 13a was brought into electric contact with the inner circumferential surface of the outer tube 12a. Subsequently, a pipe expander (not shown) was used to expand the inner tube 11a to cause the latter to come into intimate contact with the inner circumferential surface of the sealing plate 15a, so that the respective one end portions of the outer tube 12a and the inner tube 11a were sealed by the sealing plate 15.

Thereafter, the similar bead machined portion 16 was provided on the other end portion of the outer tube 12a. An electrolytic solution obtained by dissolving LiPF$_6$ by 1 mol/l was added to a mixture solution of propylene carbonate and diethyl carbonate by one-to-one in volume.

Subsequently, after the ring-shaped sealing plate 15a made of stainless steel and the ring-shaped gasket 14 made of polypropylene had been engaged with the other end portion of the inner tube 11a, the other end edge of the outer tube 12a was press-fitted. Thereafter, the other end portion of the inner tube 11a was expanded by using the similar pipe expander as mentioned above, so that the other end portion was brought into pressing contact with the inner circumferential surface of the ring-shaped plate 15a. The respective other end portions of the outer tube 12a and the inner tube 11a were sealed by the sealing plate 15a.

Thus, a double tube type cylindrical lithium ion secondary battery which was 50 mm in diameter, 300 mm long, and 25 Ah in electric capacity with a weight of 848 g and a weight energy density of 106 Wh/kg was obtained.

As comparative example 3, a spiral electrode laminate structure 13a was produced by spirally winding the strip-shaped anode 2, cathode 3, fine porous polypropylene film and aluminum foil, produced in the same way as in the foregoing example 1 around an inner tube 11a which was made of aluminum and which was 20 mm in diameter, 0.7 mm thick and 300 mm long.

The length of the non-coated portion of the anode active material 4 of the spiral electrode laminate structure 13a was adjusted so that the outermost circumferential portion of the spiral electrode laminate structure 13a could be the anode charge collector 5. An aluminum foil which was 0.05 mm thick, 190 mm wide and 160 mm long was welded through a microwave to the anode charge collector 5 of the outermost circumferential portion to form an elongated anode charge collector 5. The outer circumference of the spiral electrode laminate structure 13a was wrapped by the aluminum foil.

Subsequently, in the same way as the example 1 shown in FIG. 5, a bead machining was effected to one end portion of the outer tube 12a which was made of aluminum and which was 50 mm in diameter, 0.3 mm thick and 310 mm long to form a bead machined portion 16. The ring-shaped electric insulating gasket 14 made of polypropylene and the ring-shaped sealing plate 15a made of stainless steel were mounted on the end portion of the outer tube 12a. Thereafter, the end edge of the outer tube 12a was press-fitted. The spiral electrode laminate structure 13a which was wound around the above-described inner tube 11a was inserted into the outer tube 12a so that the end face of the inner tube and the outer surface of the sealing plate 15a were aligned exactly with each other.

In this case, the aluminum foil on the outermost circumference of the spiral electrode laminate structure 13a was brought into electric contact with the inner circumferential surface of the outer tube 12a. Subsequently, a pipe expander (not shown) was used to expand the inner tube 11a to cause the latter to come into intimate contact with the inner circumferential surface of the sealing plate 15a, so that the respective one end portions of the outer tube 12a and the inner tube 11a were sealed by the sealing plate 15.

Thereafter, the similar bead machined portion 16 was provided on the other end portion of the outer tube 12a. An electrolytic solution obtained by dissolving LiPF$_6$ by 1 mol/l was added to a mixture solution of propylene carbonate and diethyl carbonate by one-to-one in volume.

Subsequently, after the ring-shaped sealing plate 15a made of stainless steel and the ring-shaped gasket 14 made of polypropylene had been engaged with the other end portion of the inner tube 11a, the other end edge of the outer tube 12a was press-fitted. Thereafter, the other end portion of the inner tube 11a was expanded by using the similar pipe expander as mentioned above, so that the other end portion was brought into pressing contact with the inner circumferential surface of the ring-shaped plate 15a. The respective other end portions of the outer tube 12a and the inner tube 11a were sealed by the sealing plate 15a.

Thus, a double tube type cylindrical lithium ion secondary battery which was 50 mm in diameter, 300 mm long, and 25 Ah in electric capacity with a weight of 790 g and a weight energy density of 114 Wh/kg was obtained.

Five lithium ion secondary cells in accordance with each of the above-described example 1 and the comparative examples 1, 2 and 3 had been kept in a constant temperature reservoir at a temperature of 60° C. for ten days, and the average evaporation amount of the electrolyte was measured from a difference in weight between the states before and after the reservation. Then, it was regarded as a sealing reliability. The results are shown in Table 1 together with the difference in specification between the example 1 and the respective comparative examples 1 to 3.

TABLE 1

|  | example 1 | comparative example 1 | comparative example 2 | comparative example 3 |
|---|---|---|---|---|
| material of outer tube | Al | stainless steel | Al | Al |
| thickness of outer tube (mm) | 0.30 | 0.50 | 0.75 | 0.30 |
| material of inner tube | stainless steel | Al | stainless steel | stainless steel |
| thickness of inner tube (mm) | 0.70 | 1.00 | 0.70 | 0.70 |
| reinforcement ring | yes | no | no | no |
| weight of cell (g) | 812 | 889 | 848 | 790 |
| weight energy density (Wh/kg) | 111 | 101 | 106 | 114 |
| reduced weight for ten days at 60° C. (g) | 0.05 | 0.40 | 0.05 | 13 |

In the comparative example 2 in which the outer tube 12 which was made of aluminum and which had the same mechanical strength as that of the outer tube 12 made of stainless steel of the comparative example 1, the weight energy density was improved only by about 5% but the good sealability was kept.

In the example 3 in which the reinforcement ring 20 of the example 1 was not used, the weight energy density was increased by 14% in comparison with the comparative example 1 but the sealability was insufficient. Since the reinforcement ring 20 was provided in the example 1, a sufficient sealability was kept and in addition the weight energy density was improved by 10% in comparison with the comparative example 1.

Also, as shown in FIGS. 1 and 5, in the lithium ion secondary cell, it is possible to provide an openable valve which will be opened when the internal pressure at one or both of the ring-shaped sealing plates 15 and 15a provided in one and other ends of the tubes exceeds a predetermined level.

Figures 7A, 7B:
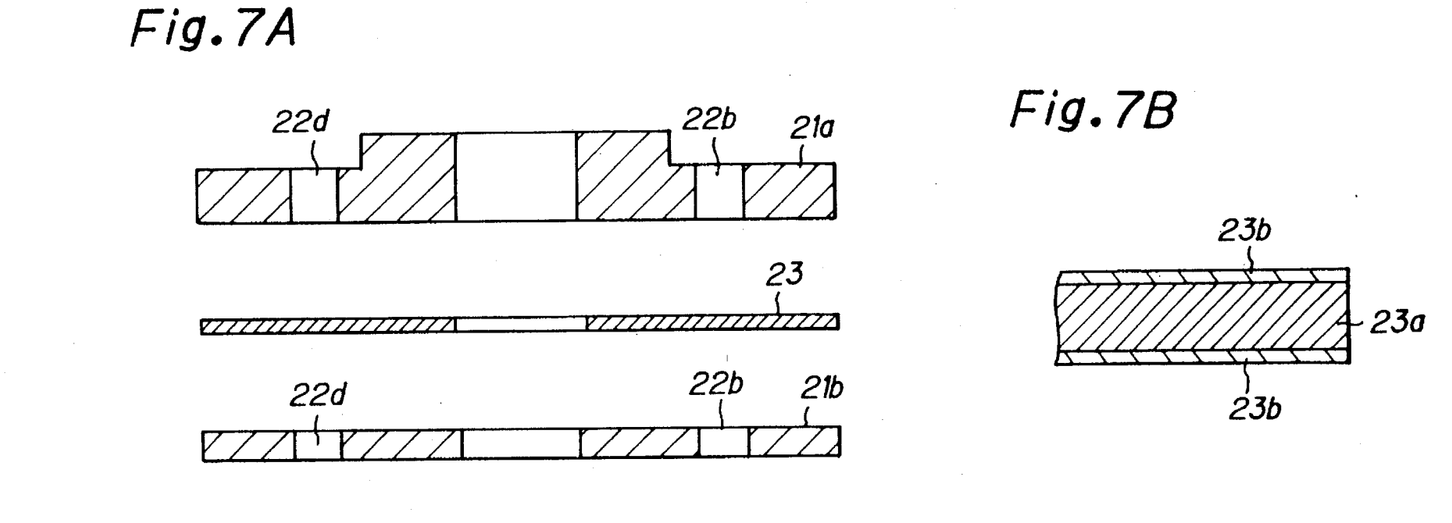
FIGS. 7A, 7B and 7C are views showing an openable valve which may be used in the embodiments of the invention.
Figure 7C:
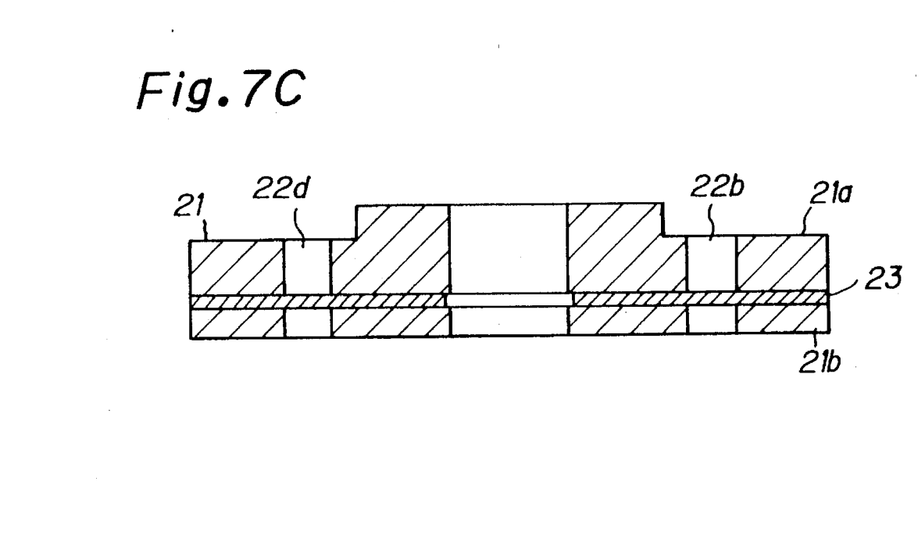

FIGS. 7A to 7C and 8 show an example of the ring-shaped sealing plate provided with the openable valve. As shown in FIG. 7A and 7C, the ring-shaped sealing plate 21 having the openable valve is composed of one and other aluminum ring-shaped sealing plates 21a and 21b having four vent holes 22a, 22b, 22c and 22d in communication with each other when overlapped, and a ring-shaped film member 23 interposed between the two ring-shaped sealing plates 21a and 21b. The ring-shaped film member 23 is fixed between the two ring-shaped sealing plates 21a and 21b so as to close the four vent holes 22a, 22b, 22c and 22d.

As shown in FIG. 7B, an assembly produced by laminating modified polypropylene sheets each having a thickness of 0.05 mm on both sides of an aluminum foil 23a having a thickness of 0.025 mm is punched out into a ring having an outer diameter of 45 mm and an inner diameter of 21 mm to form the film member 23. In this example, the film member 23 is sandwiched by the two aluminum ring-shaped sealing plates 21a and 21b so that the vent holes 22a, 22b, 22c and 22d are overlapped in exact alignment with each other. This is heated up to 220° C. and is melt-bonded between the ring-shaped sealing plates 21a and 21b to form the film member 23 into the openable valve.

Figure 8:
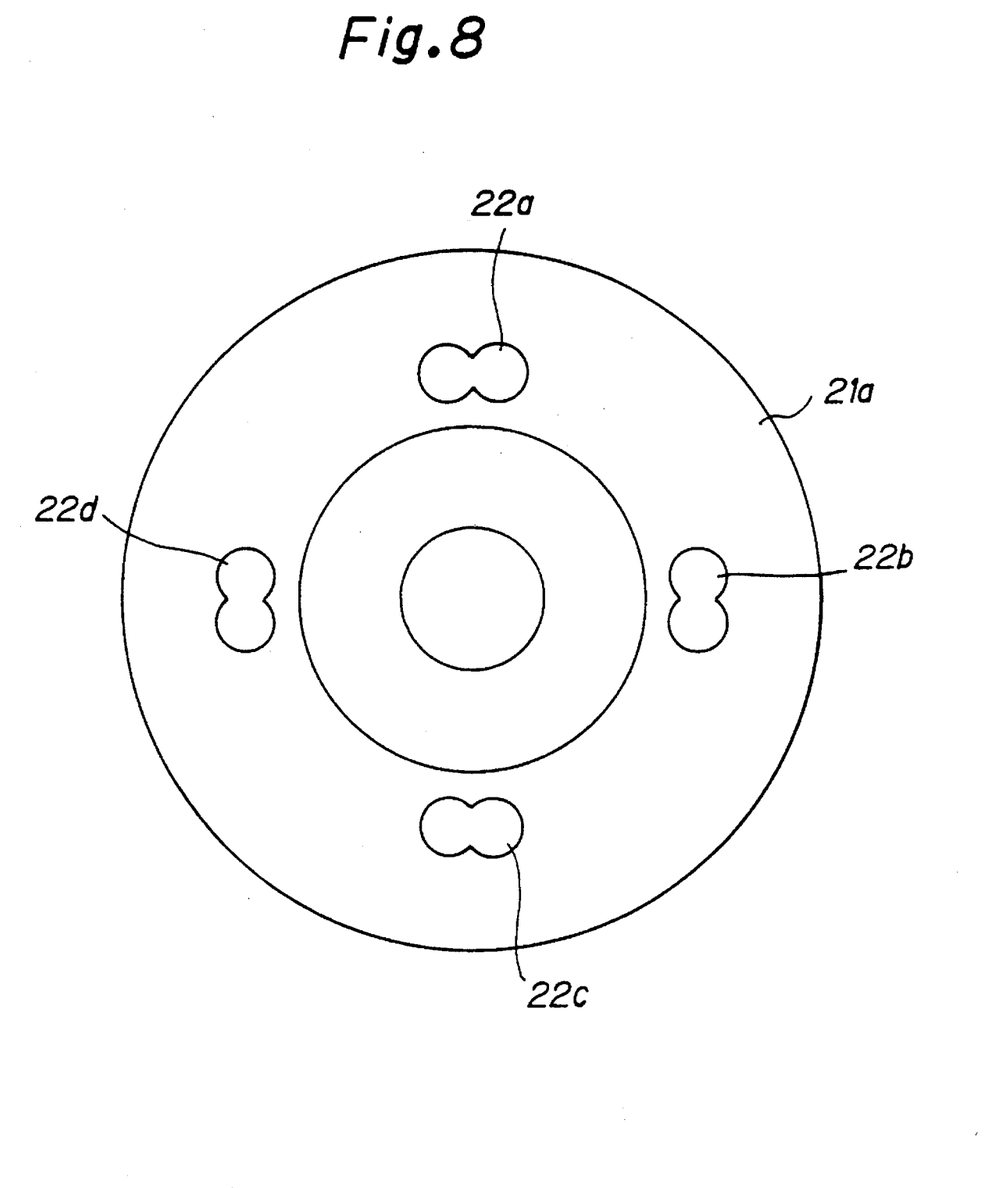
FIG. 8 is a plan view showing the openable valve member shown in FIGS. 7A to 7C.

Also, as shown in FIG. 8, the vent holes 22a, 22b, 22c and 22d each have a shape which is defined by partially overlapped circles. When any deformation of the openable valve composed of the film member 23 is caused by the increase of the internal pressure, the openable valve is torn by projections defined by the overlap of the two circles to release the internal pressure.

In this case, the pressure at which the openable valve made of the film member 23 is opened depends upon the extent of the projections. In the above-described example, the pressure is about 5 to 10 kgf/cm$^2$ so that it is possible to sufficiently work the function to release the inner pressure before it reaches an abnormal pressure.

Although the examples in which the invention is applied to the lithium ion secondary cell have been explained in the foregoing embodiments, it is apparent that the invention may be applied to any other nonaqueous electrolyte secondary cell. Also, in the foregoing embodiments, the inner tubes 11 and 11a are expanded by the pipe expander to be brought into pressing contact with the inner circumferential surfaces of the ring-shaped sealing plates 15 and 15a. However, it is apparent that this portion may be subjected to an additional laser seam weld as desired. Also, it is apparent that the invention is not limited to or by the foregoing specific embodiments and various modifications and changes are possible without departing from the spirit of the invention.

According to the present invention, since, the ring-shaped electrically insulating gaskets are inserted into the inner circumference of the outer tube at both end portions of the inner tube and outer tube and the ring-shaped sealing plates are brought into pressing contact between the inner circumference of the ring-shaped electrically insulating gaskets and the outer circumference of the inner tube, it is possible to readily perform the sealing by, for example, the pipe expander. There is no fear that the spiral electrode laminate structure or the like would be damaged due to the elevation of the temperature. Thus, the productability is improved. In addition, it is possible to provide a high sealability.

Also, according to the invention, the inner holes of the inner tube serves as a vent hole. Thus, the heat radiation performance is improved.

What I claim is:

1. A nonaqueous electrolyte secondary cell comprising:

an outer tube;

an inner tube substantially coaxially disposed with respect to said outer tube;

a first ring-shaped electrically insulating gasket inserted into an inner circumference of a first end of said outer tube;

a first ring-shaped sealing plate for sealing a portion between said first ring-shaped electrically insulating gasket and the first end of said inner tube;

a spiral electrode laminate structure in which strip-shaped anode and cathode impregnated with nonaqueous electrolyte solution between the first end and a second end of said inner tube are spirally wound through a separator, by using said inner tube as a core;

a second ring-shaped electrically insulating gasket inserted into an inner circumference of a second end of said outer tube; and a second ring-shaped sealing plate for sealing a portion between said second ring-shaped electrically insulating gasket and an outer circumference of the second end of said inner tube.

2. The secondary cell according to claim 1, wherein said inner tube and said first and second ring-shaped sealing plates are made of metal having a press-bonding property.

3. The secondary cell according to claim 2, wherein one of said anode and said cathode of said spiral electrode laminate structure is connected to said inner tube, and the other is connected to said outer tube.

4. The secondary cell according to claim 3, wherein said anode is connected to said inner tube and said inner tube is made of aluminum.

5. The secondary cell according to claim 1, at least one of said first and second ring-shaped sealing plates is provided with an openable valve which is opened to release an inner pressure when an internal pressure is increased to exceed a set level.

6. The secondary cell according to claim 5, wherein said ring shaped sealing plate having said openable valve is composed of first and second ring-shaped members each having at least one vent hole in communication with each other when overlapped, and a film member sandwiched between said first and second ring-shaped members, said film member being fixed between said first and second ring-shaped members for closing the vent holes.

7. The secondary cell according to claim 6, wherein said film member is a film coated with a polymer layer on both sides of an aluminum foil.

8. A method for producing a nonaqueous electrolyte secondary cell, comprising the following steps of:

forming a spiral electrode laminate structure by spirally winding a strip-shaped anode and a strip-shaped cathode around an inner tube between a first end and a second end of said inner tube so that the strip-shaped cathode and the strip-shaped anode are in confronting relation with each other through a separator;

inserting the spiral electrode laminate structure spirally wound around said inner tube into an outer tube;

inserting a first ring-shaped electrically insulating gasket into an inner circumference of a first end of said inner tube, inserting a first ring-shaped sealing plate between said first ring-shaped electrically gasket and the first end of said inner tube, expanding the first end of said inner tube from inside by using a pipe expanding means to thereby press-bond the first end of said inner tube and said first ring-shaped sealing plate, and sealing a portion between the first end of said outer tube and the first end of said inner tube;

injecting a nonaqueous electrolyte solution between the second end of said inner tube and a second end of said outer tube with the sealed first end of said outer tube and the sealed first end of said inner tube being directed downwardly; and after the injection of the nonaqueous electrolyte solution, inserting a second ring-shaped electrically insulating gasket into an inner circumference of the second end of said inner tube, inserting a second ring-shaped sealing plate between said second ring-shaped electrically gasket and the second end of said inner tube, expanding the second end of said inner tube from inside by using a pipe expanding means to thereby press-bond the second end of said inner tube and said second ring-shaped sealing plate, and sealing a portion between the second end of said outer tube and the second end of said inner tube.

9. The method according to claim 8, wherein prior to the injection of the nonaqueous electrolyte solution, said first ring-shaped sealing plate is sealed by press-fitting the outer tube through the first ring-shaped electrically insulating gasket, and after the injection of the nonaqueous electrolyte solution, said second ring shaped sealing plate is sealed by press-fitting the outer tube through said second ring-shaped electrically insulating gasket.

* * * * *